(12) United States Patent
Reiman et al.

(10) Patent No.: US 10,135,292 B2
(45) Date of Patent: Nov. 20, 2018

(54) METHOD AND SYSTEM FOR SIMULTANEOUSLY CHARGING AN ENERGY STORAGE DEVICE FROM MULTIPLE ENERGY INPUT DEVICES

(71) Applicant: Neah Power Systems, Inc., Bothell, WA (US)

(72) Inventors: Derek Reiman, Lynnwood, WA (US); Chris D'Couto, Edmonds, WA (US); Saroj Sahu, Fremont, CA (US)

(73) Assignee: Neah Power Systems, Inc., Bothell, WA (US)

( * ) Notice: Subject to any disclaimer, the term of this patent is extended or adjusted under 35 U.S.C. 154(b) by 288 days.

(21) Appl. No.: 14/808,287

(22) Filed: Jul. 24, 2015

(65) Prior Publication Data

US 2016/0028273 A1    Jan. 28, 2016

Related U.S. Application Data

(60) Provisional application No. 62/028,610, filed on Jul. 24, 2014.

(51) Int. Cl.
| | |
|---|---|
| *H02J 7/00* | (2006.01) |
| *H02J 7/35* | (2006.01) |
| *H01M 10/46* | (2006.01) |
| *H01M 10/44* | (2006.01) |
| *H01L 31/02* | (2006.01) |
| *H02S 40/34* | (2014.01) |
| *H02S 40/36* | (2014.01) |

(Continued)

(52) U.S. Cl.
CPC ........... *H02J 7/355* (2013.01); *H01M 10/465* (2013.01); *H02J 7/0045* (2013.01); *H02J 7/0052* (2013.01); *H02J 7/0055* (2013.01); *H02J 7/35* (2013.01); *H02J 2007/0059* (2013.01); *H02S 30/10* (2014.12); *H02S 30/20* (2014.12); *H02S 40/34* (2014.12); *Y02E 10/50* (2013.01)

(58) Field of Classification Search
CPC .......... H02J 7/35; H02J 7/355; H01M 10/465; Y02E 10/566
USPC ......................................... 320/101; 136/244
See application file for complete search history.

(56) References Cited

U.S. PATENT DOCUMENTS

| | | | | |
|---|---|---|---|---|
| 5,701,067 A | * | 12/1997 | Kaji | A45C 15/00 |
| | | | | 136/293 |
| 7,667,433 B1 | * | 2/2010 | Smith | H01M 10/46 |
| | | | | 320/115 |

(Continued)

*Primary Examiner* — David V Henze-Gongola
*Assistant Examiner* — Tarikh Rankine
(74) *Attorney, Agent, or Firm* — Patent2ip LLC; Tue Nguyen

(57) ABSTRACT

A system for simultaneously charging an energy storage device from multiple energy input devices includes energy input devices in the form of solar and non-solar modules and an energy storage device in the form of a rechargeable battery, which is part of an energy storage module. A first solar module is able to generate solar power and delivers this power to the energy storage module, while the non-solar module delivers, for example, electrochemically generated electricity to the energy storage module via the first solar module, which acts as a backplane. The system may also include additional solar modules that can be connected to the first solar module in collapsed or expanded states to adjust the amount of electricity generated from solar power.

19 Claims, 13 Drawing Sheets

(51) Int. Cl.
*H02S 30/20* (2014.01)
*H02S 30/10* (2014.01)

(56) References Cited

U.S. PATENT DOCUMENTS

| | | | | |
|---|---|---|---|---|
| 7,839,019 B2* | 11/2010 | Chang | ............... | H02J 7/0054 |
| | | | | 307/64 |
| 2010/0109599 A1* | 5/2010 | Lin | ............... | H02J 7/355 |
| | | | | 320/101 |
| 2011/0140649 A1* | 6/2011 | Choi | ............... | H01M 14/005 |
| | | | | 320/101 |
| 2011/0278933 A1* | 11/2011 | Anderson | ............... | H02J 9/04 |
| | | | | 307/66 |
| 2011/0304295 A1* | 12/2011 | McNally | ............... | H01M 10/46 |
| | | | | 320/101 |
| 2013/0221896 A1* | 8/2013 | Dong | ............... | H02J 7/0003 |
| | | | | 320/101 |
| 2013/0234645 A1* | 9/2013 | Goei | ............... | H02J 7/0052 |
| | | | | 320/101 |
| 2015/0171484 A1* | 6/2015 | Lenardic | ............... | H01M 10/465 |
| | | | | 320/101 |

* cited by examiner

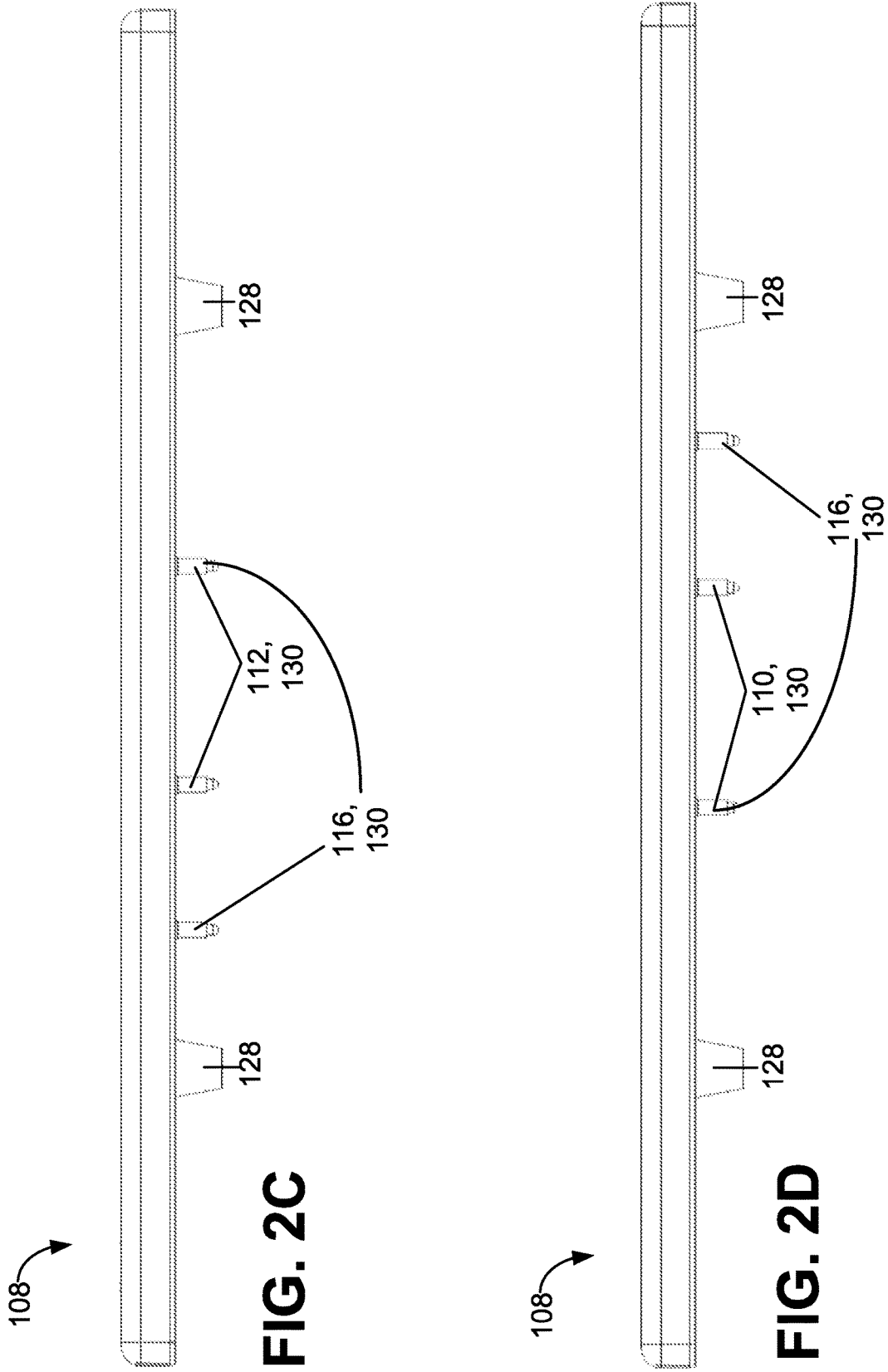

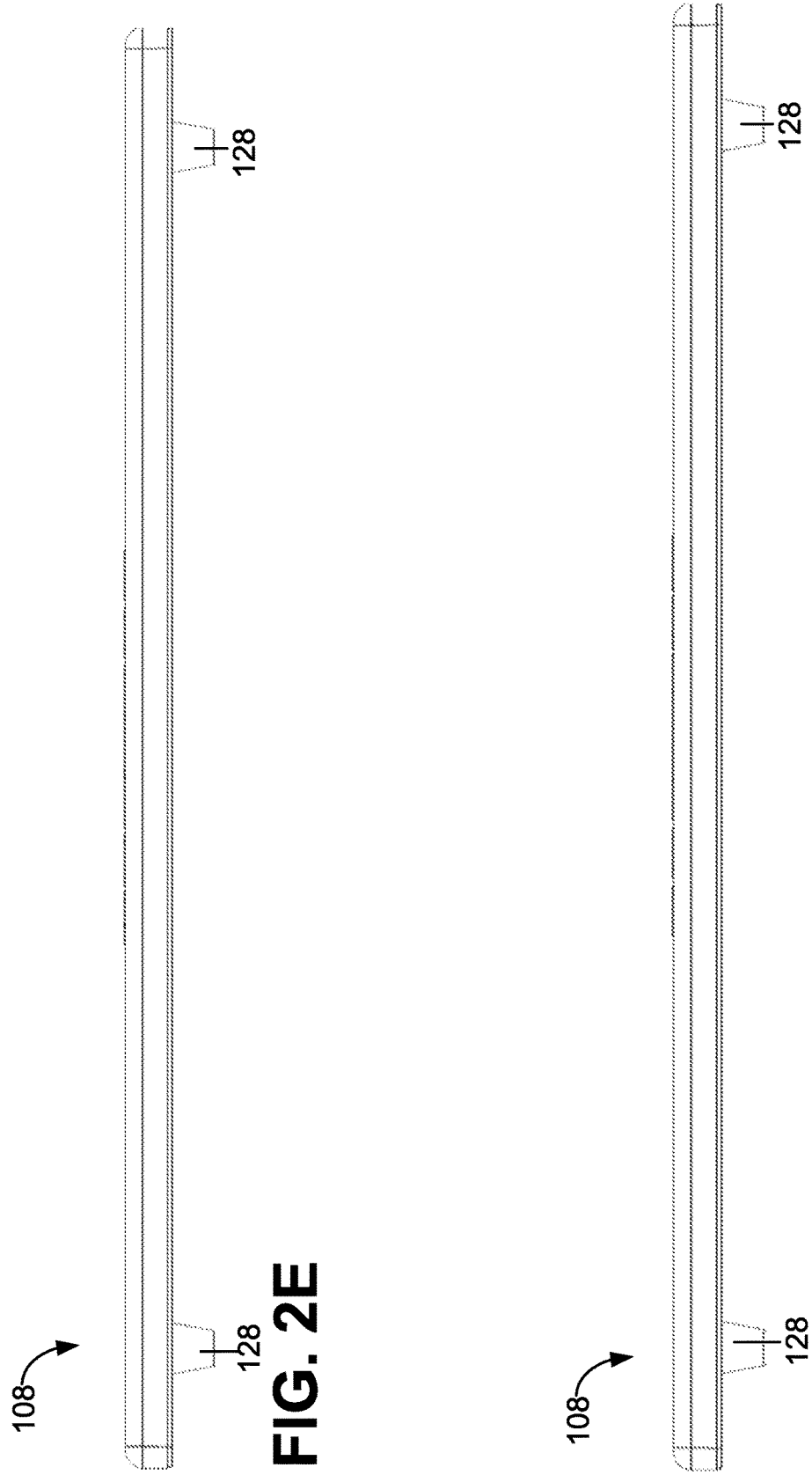

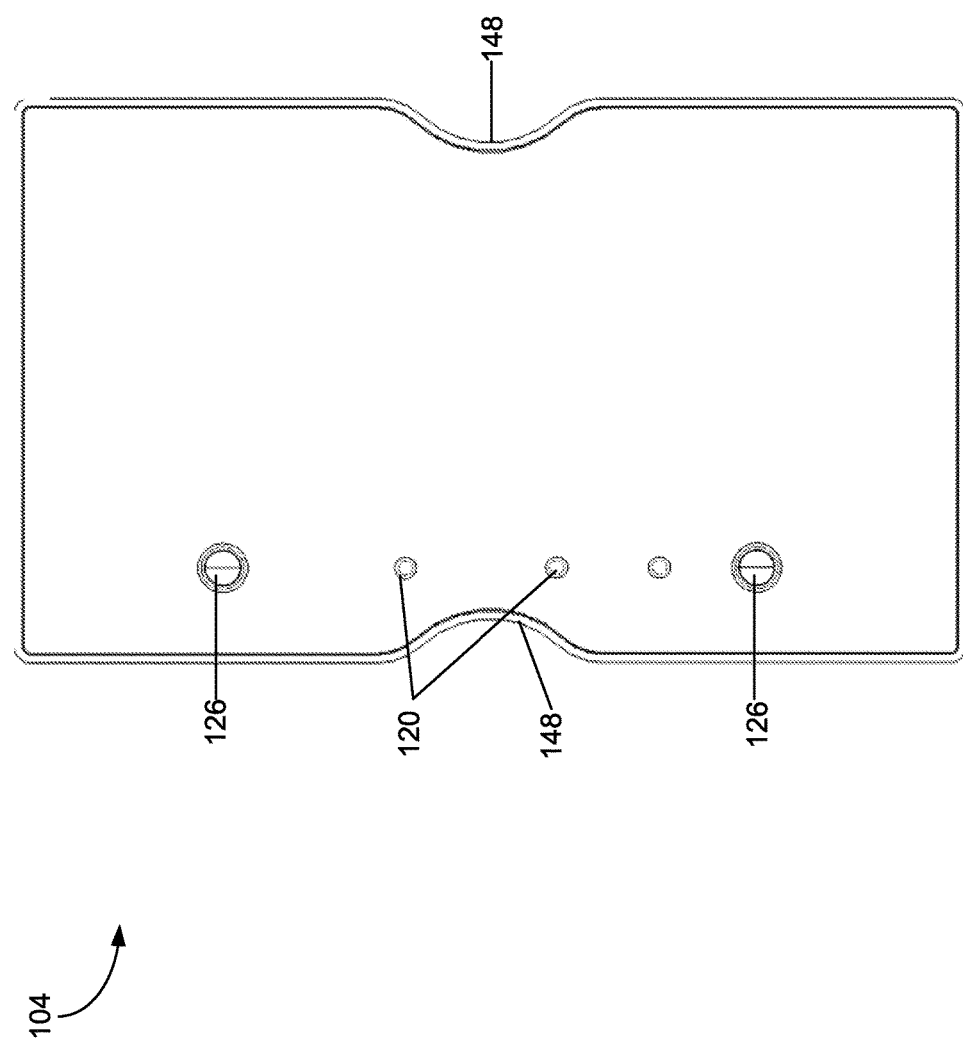

METHOD AND SYSTEM FOR SIMULTANEOUSLY CHARGING AN ENERGY STORAGE DEVICE FROM MULTIPLE ENERGY INPUT DEVICES

TECHNICAL FIELD

The present disclosure is directed at methods, systems, and techniques for simultaneously charging an energy storage device from multiple energy input devices.

BACKGROUND

A key concern of a consumer when purchasing a mobile device such as a smartphone or tablet is the battery life of that device. A consumer does not want his or her mobile device to exhaust its battery power in the middle of a day while the consumer is away from a conventional power source such as a wall outlet or car charger. A consumer's options are typically limited in the event that consumer needs to recharge a battery while away from a conventional power source. There accordingly exists a need for additional methods, systems, and techniques that permit a consumer to recharge a battery or otherwise access electricity when that consumer is unable or unwilling to rely on a conventional power source.

SUMMARY

According to a first aspect, there is provided a system for charging an energy storage device, the system comprising a first solar module comprising a first photovoltaic panel; first solar power output terminals electrically coupled to the first photovoltaic panel; and flow-through input and output terminals electrically coupled to each other; a non-solar module releasably coupled to the first solar module, the non-solar module comprising non-solar input terminals for electrical coupling to an energy input device and non-solar output terminals electrically coupled to the non-solar input terminals, wherein the non-solar output terminals are electrically coupled to the flow-through input terminals only when the non-solar module is coupled to the first solar module; and an energy storage module releasably coupled to the first solar module, the energy storage module comprising: the energy storage device; and solar charging terminals and non-solar charging terminals electrically coupled to the energy storage device, wherein the solar charging terminals are electrically coupled to the first solar power output terminals and the non-solar charging terminals are electrically coupled to the flow-through output terminals only when the energy storage module is coupled to the first solar module.

At least one of the first solar module and the non-solar module may comprise a magnet and at least the other of the first solar module and the non-solar module may comprise a ferromagnetic material, and the magnet and the ferromagnetic material may releasably couple the first solar module and the non-solar module together.

At least one of the first solar module and the energy storage module may comprise a magnet and at least the other of the first solar module and the energy storage module may comprise a ferromagnetic material, and the magnet and the ferromagnetic material may releasably couple the first solar module and the energy storage module together.

At least one of the first solar module and the non-solar module may comprise spring-loaded electrically conductive pins that electrically couple the non-solar output terminals and the flow-through input terminals together.

At least one of the first solar module and the energy storage module may comprise spring-loaded electrically conductive pins that electrically couple the flow-through output terminals and the non-solar charging terminals together and that electrically couple the first solar power output terminals and the solar charging terminals together.

The first solar module may further comprise first solar power input terminals electrically coupled to the first solar power output terminals in parallel with the first photovoltaic panel, and the system may further comprise a second solar module releasably coupled to the first solar module, the second solar module comprising a second photovoltaic panel; and second solar power output terminals electrically coupled to the second photovoltaic panel and to the first solar power input terminals, the second solar power output terminals being electrically coupled to the first solar power input terminals only when the first and second solar modules are coupled together.

The system may further comprise a third solar module releasably coupled to the first solar module, the third solar module comprising a third photovoltaic panel; and third solar power output terminals electrically coupled to the third photovoltaic panel and to the first solar power input terminals, the third solar power output terminals being electrically coupled to the first solar power input terminals only when the first and third solar modules are coupled together.

At least one of the first and second solar modules may comprise a magnet and at least the other of the first and second solar modules may comprise a ferromagnetic material, and the magnet and the ferromagnetic material may releasably couple the first and second solar modules together.

At least one of the first and third solar modules may comprise a magnet and at least the other of the first and third solar modules may comprise a ferromagnetic material, and the magnet and the ferromagnetic material may releasably couple the first and third solar modules together.

At least one of the first and second solar modules may comprise spring-loaded electrically conductive pins that electrically couple the second solar power output terminals and the first solar power input terminals together; and at least one of the first and third solar modules may comprise spring-loaded electrically conductive pins that electrically couple the third solar power output terminals and the first solar power input terminals together.

Each of the solar modules may be square or rectangular, and the first through third photovoltaic panels may be located on a central portion of the first through third solar modules, respectively; each of the first through third solar modules may comprise magnets that may be located in the corners of the first through third solar modules, respectively; the first solar power input terminals may be located on left and right edge portions of a top side of the first solar module; the second solar power output terminals may be located on a right edge portion of an underside of the second solar module; and the third solar power output terminals may be located on a left edge portion of an underside of the third solar module. The solar modules may be couplable in a collapsed state in which the first through third solar modules are stacked on each other and an expanded state in which the right edge portion of the underside of the second solar panel is magnetically coupled to the left edge portion of the top side of the first solar panel and the left edge portion of the underside of the third solar panel is magnetically coupled to the right edge portion of the top side of the first solar panel.

The first through third solar modules may be identical to each other.

The energy storage module may further comprise a device charging port, electrically coupled to the energy storage device, for connection to and charging of an electrically powered device.

According to another aspect, there is provided a system for charging an energy storage device, the system comprising a first solar module comprising a first photovoltaic panel; and a first backplane comprising flow-through traces and solar power traces, the solar power traces being electrically coupled to the first photovoltaic panel; a non-solar module releasably coupled to the first solar module, the non-solar module comprising non-solar input terminals for electrical coupling to an energy input device and non-solar output terminals electrically coupled to the non-solar input terminals, wherein the non-solar output terminals are electrically coupled to the flow-through traces only when the non-solar module is coupled to the first solar module; and an energy storage module releasably coupled to the first solar module, the energy storage module comprising the energy storage device; and solar charging terminals and non-solar charging terminals electrically coupled to the energy storage device, wherein the solar and non-solar charging terminals are electrically coupled to solar power traces and the flow-through traces, respectively, only when the energy storage module is coupled to the first solar module.

The system may further comprise a second solar module comprising a second photovoltaic panel; and second solar power output terminals electrically coupled to the second photovoltaic panel and to the solar power traces, the second solar power output terminals being electrically coupled to the solar power traces only when the first and second solar modules are coupled together; and a third solar module comprising a third photovoltaic panel; and third solar power output terminals electrically coupled to the third photovoltaic panel and to the solar power traces, the third solar power output terminals being electrically coupled to the solar power traces only when the first and third solar modules are coupled together.

The first through third photovoltaic panels may be electrically coupled together in parallel.

The first through third solar modules may have identical dimensions, or be completely identical.

The system may be configurable in collapsed and expanded states, wherein when in the expanded state, the second solar module is releasably couplable to a left edge portion of the first solar module and wherein the third solar module is releasably couplable to a right edge portion of the first solar module, the first photovoltaic panel being between the left and right edge portions of the first solar module; and when in the collapsed state, the second solar module is stacked directly on and entirely overlaps the first solar module and the third solar module is stacked directly on and entirely overlaps the second solar module.

The energy storage module may further comprise a first boost converter electrically coupled in series between the solar charging terminals and the energy storage device, wherein a voltage at the solar charging terminals is less than a minimum voltage required to charge the energy storage device; a second boost converter electrically coupled in series between the non-solar charging terminals and the energy storage device, wherein a voltage at the non-solar charging terminals is less than the minimum voltage required to charge the energy storage device; a device charging port, electrically coupled to the energy storage device, for connection to and charging of an electrically powered device; and a buck converter electrically coupled in series between the device charging port and the energy storage device.

According to another aspect, there is provided a system for charging an energy storage device, the system comprising a first solar module comprising a first photovoltaic panel; a first backplane comprising flow-through traces and solar power traces, the solar power traces being electrically coupled to the first photovoltaic panel; one or more additional solar modules, each of the additional solar modules releasably coupled to another of the solar modules and comprising an additional photovoltaic panel; an additional backplane comprising solar power traces, the solar power traces for the additional backplane being electrically coupled to the additional photovoltaic panel and being electrically coupled to the solar power traces of the first backplane only when the additional solar module is coupled to the first solar module; a non-solar module releasably coupled to the first solar module, the non-solar module comprising non-solar input terminals for electrical coupling to an energy input device and non-solar output terminals electrically coupled to the non-solar input terminals, wherein the non-solar output terminals are electrically coupled to the flow-through traces only when the non-solar module is coupled to the first solar module; and an energy storage module releasably coupled to the first solar module, the energy storage module comprising the energy storage device; and solar charging terminals and non-solar charging terminals electrically coupled to the energy storage device, wherein the solar and non-solar charging terminals are electrically coupled to solar power traces and the flow-through traces, respectively, only when the energy storage module is coupled to the first solar module, wherein the system is configurable between collapsed and expanded states, wherein when in the expanded state each of the additional solar modules is releasably couplable to an edge portion of another of the solar modules; and when in the collapsed state, the solar modules are stacked directly on and entirely overlap another of the solar modules.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 2A-2F are top plan, bottom plan, right side elevation, left side elevation, front elevation, and rear elevation views of one of three solar modules that comprises part of the system of FIG. 1.

FIGS. 3A-3F are top plan, bottom plan, right side elevation, left side elevation, front elevation, and rear elevation views of a non-solar module that comprises part of the system of FIG. 1.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

When a consumer is away from a conventional power source ("off-grid"), there are relatively few ways that consumer can conveniently recharge a battery or otherwise provide power to an electrical device. The present disclosure discloses embodiments in which different types of energy input devices are used to charge an energy storage device, such as a rechargeable battery. One of the energy input devices comprises a solar module and another of the energy input devices is non-solar; for example, one of the energy input devices may generate power electrochemically and may accordingly be an alkaline battery or a fuel cell. The complementary energy input devices and the rechargeable battery collectively comprise a system that permits the consumer to access electricity even when he or she is off-grid.

Figure 1A:
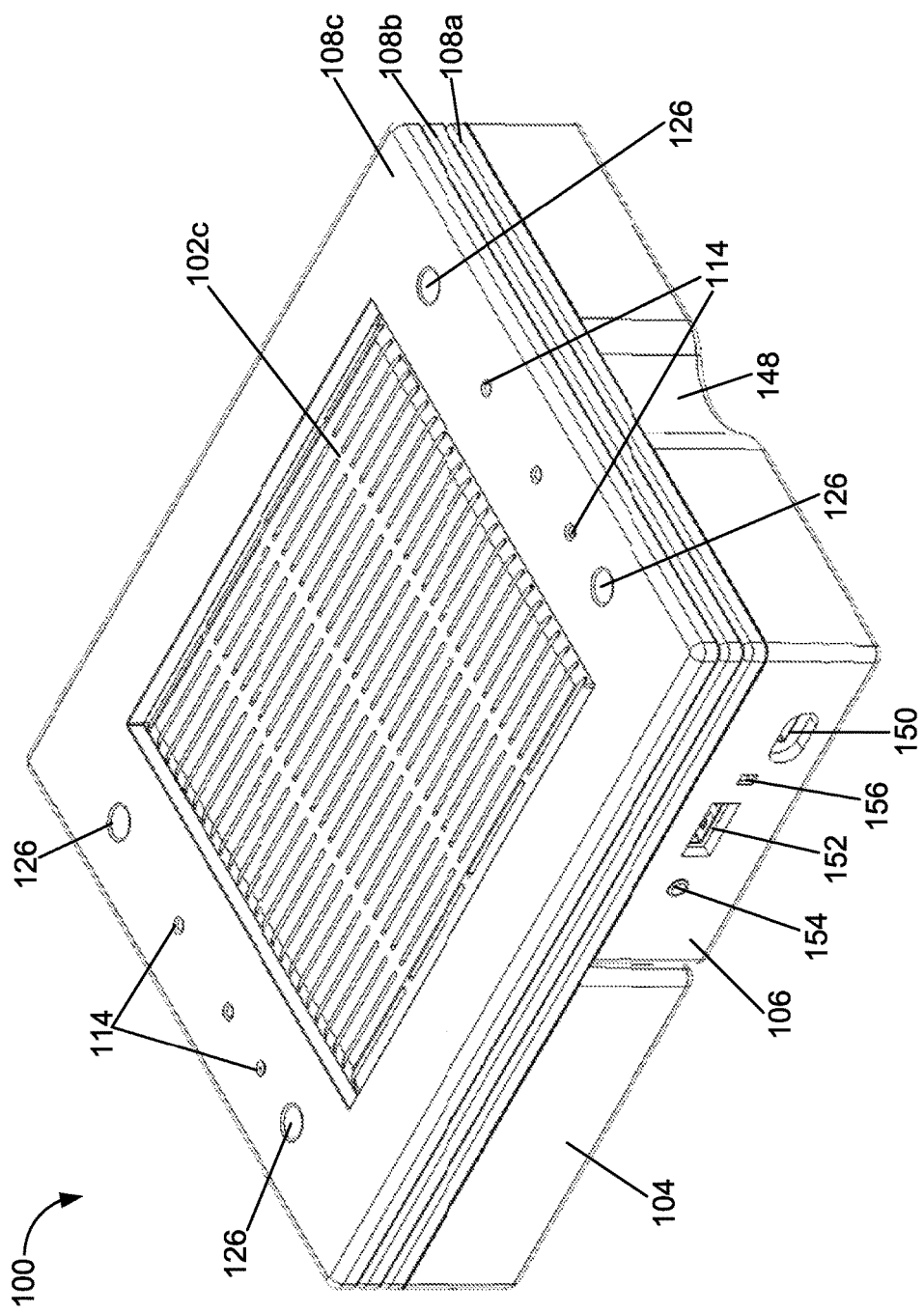
FIG. 1A is a perspective view of a system for simultaneously charging an energy storage device from multiple energy input devices, according to a first embodiment in which the system is shown in a collapsed state.
Figure 1B:
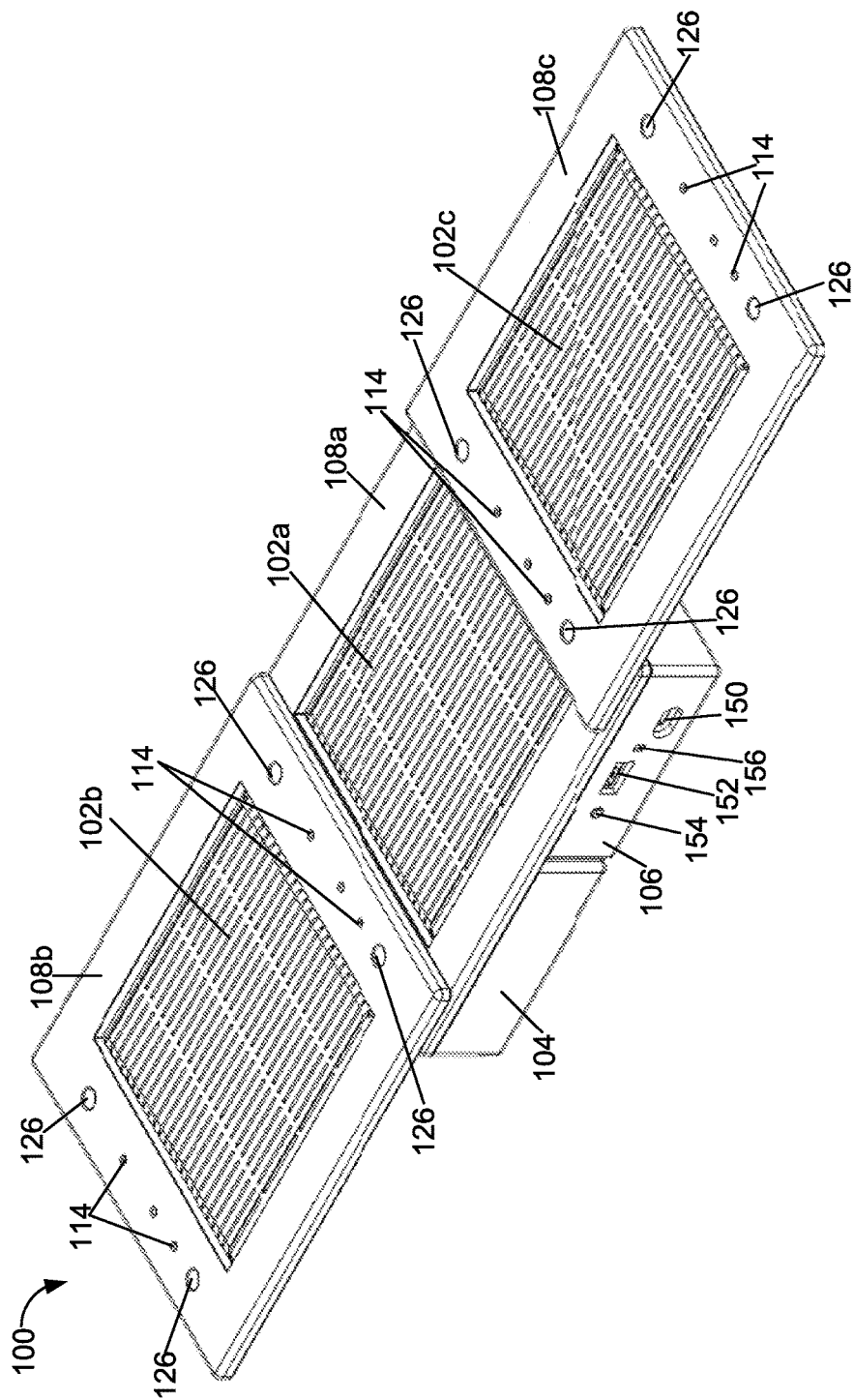
FIG. 1B is a perspective view of the system of FIG. 1A in which the system is shown in an expanded state.
Figure 3B:
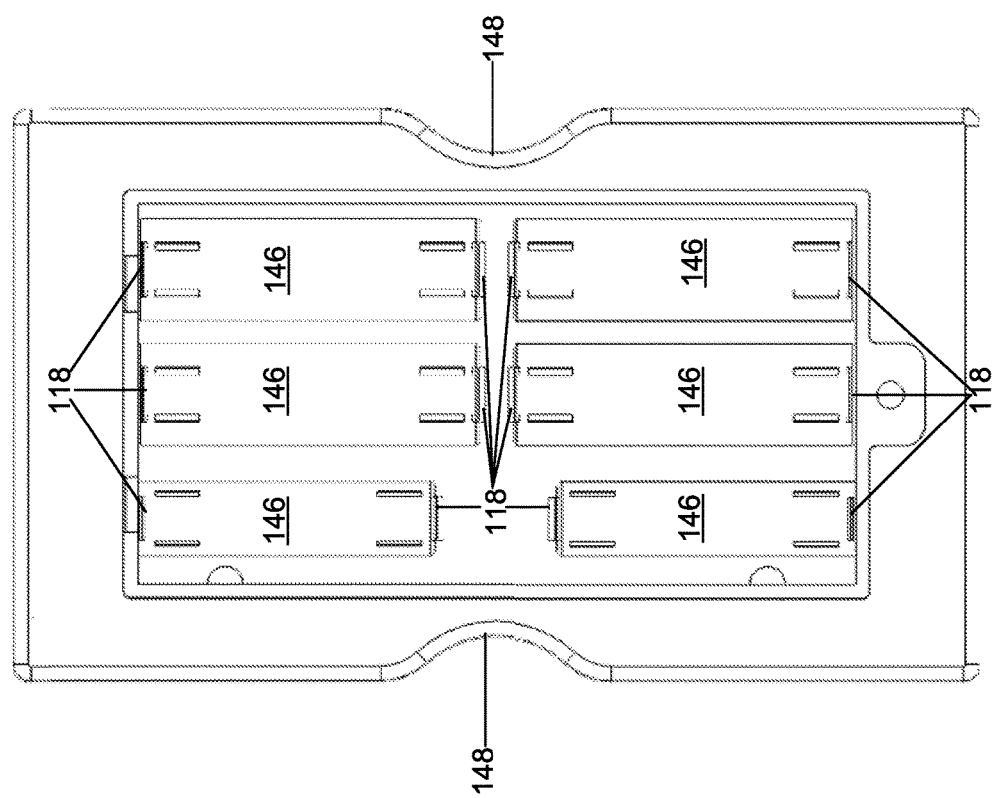
Figure 3C:
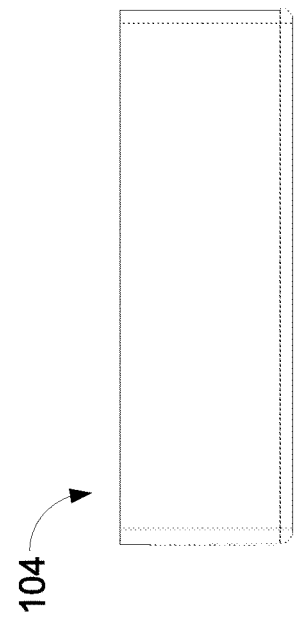
Figure 3E:
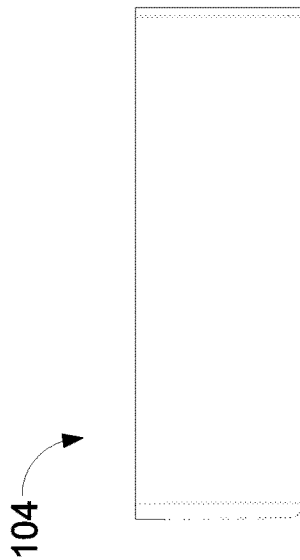
Figure 3D:
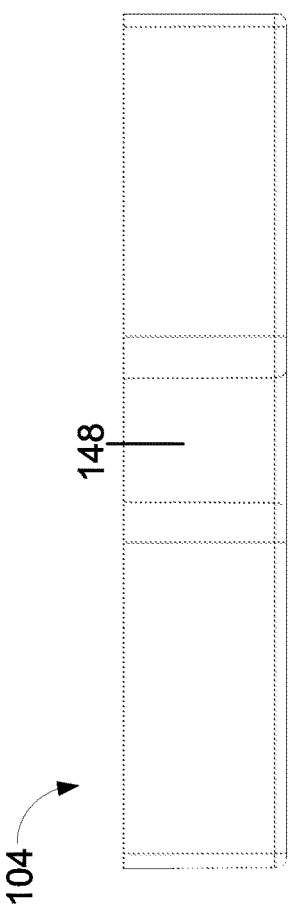
Figure 3F:
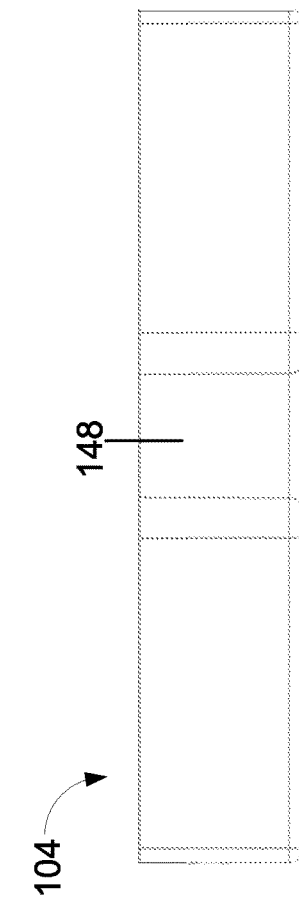
Figure 4A:
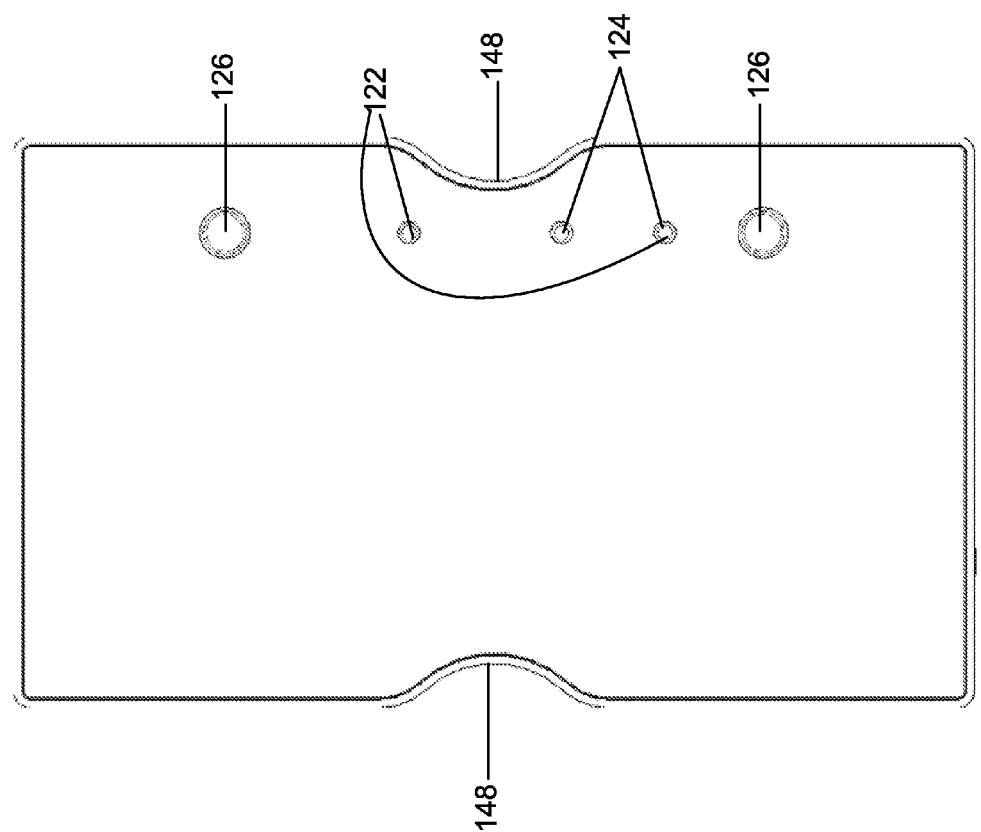
FIGS. 4A-4F are top plan, bottom plan, right side elevation, left side elevation, front elevation, and rear elevation views of an energy storage module that comprises part of the system of FIG. 1.
Figure 4B:
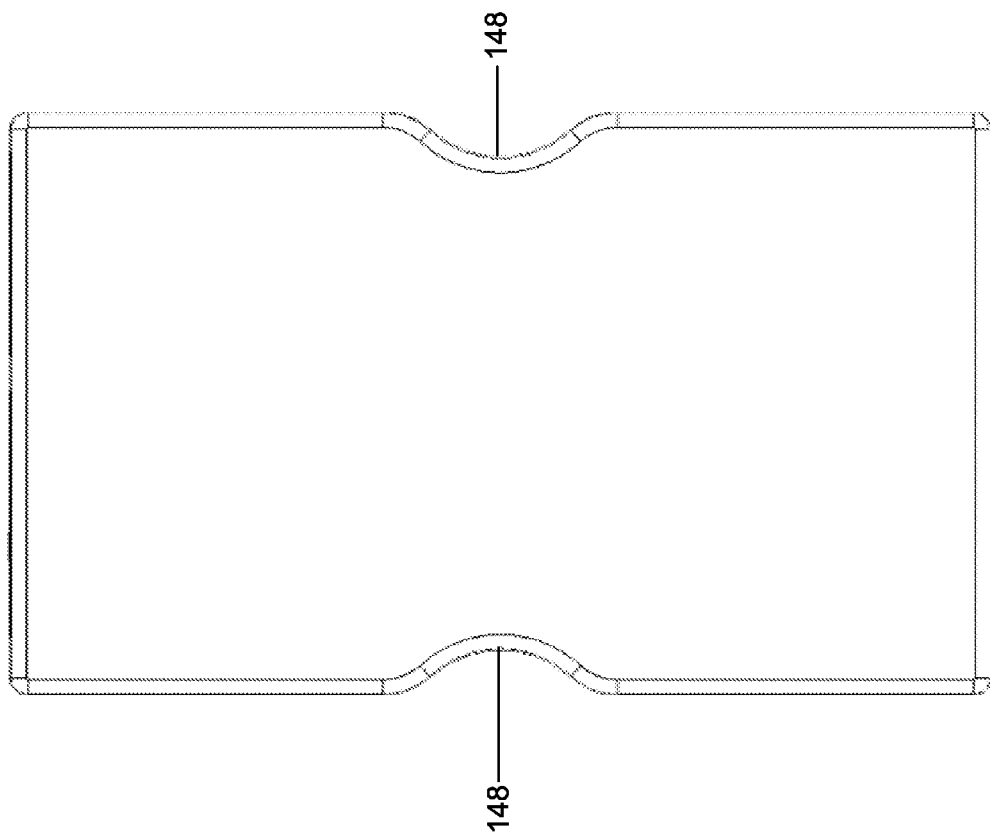
Figure 4E:
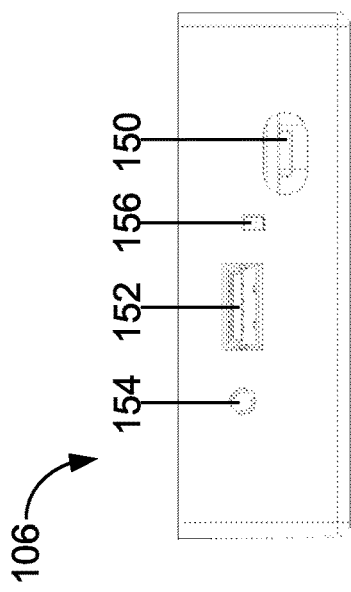
Figure 4F:
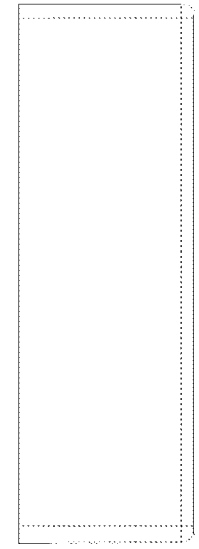
Figure 4C:
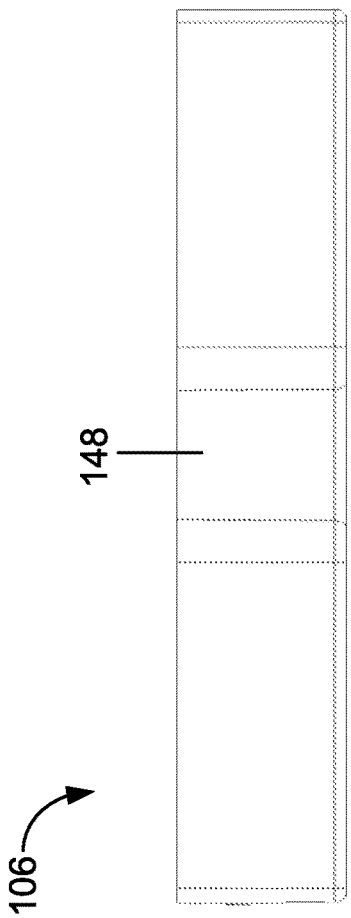
Figure 4D:
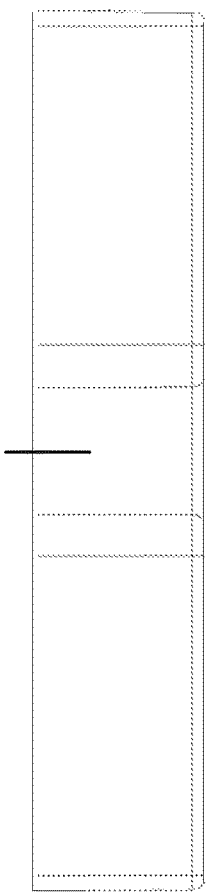

Referring now to FIGS. 1A and 1B, there are shown perspective views of a system 100 for simultaneously charging an energy storage device from multiple energy input devices in collapsed and expanded states, respectively. The system 100 comprises first through third solar modules 108a-c (collectively, "solar modules 108"), a non-solar module 104, and an energy storage module 106. The non-solar module 104 in the depicted embodiments comprises an energy input device in the form of alkaline batteries 146 (shown in FIG. 3B) but in alternative embodiments (not depicted) may comprise an alternative energy input device such as a fuel cell, another type of energy input device that provides energy electrochemically, or a non-electrochemical energy source. The energy storage module comprises a rechargeable battery 502 (shown in FIG. 5), a push-button 154 that wakes the system 100 from sleep, a device charging port in the form of USB port 152, and a system charging port in the form of micro-USB port 150 that allows the rechargeable battery 502 to be recharged using AC power from an AC adapter ("wall wart").

In FIG. 1A, the three solar modules 108 are releasably coupled to each other using corner and central magnets 132,134 (shown in and discussed in further detail in respect of FIG. 2B), and these magnets 132,134 also releasably couple the first solar module 108a to each of the non-solar and energy storage modules 104,106. The magnets 132,134 allow the system 100 to be arranged in two states: a collapsed state as shown in FIG. 1A in which the solar modules 108 are stacked on the non-solar and energy storage modules 104,106; and an expanded state as shown in FIG. 1B in which the first solar module 108a is stacked on the non-solar and energy storage modules 104,106 and in which the second and third solar modules 108b,c are respectively releasably coupled via the corner magnets 132 to left and right edge portions 136a,b (labeled in FIG. 2A) of the first solar module 108a. This increases the surface area available for capturing sunlight relative to the collapsed state. Each of the housings of the modules 108 comprises a ferromagnetic material (e.g., iron, nickel, or cobalt) to permit the magnets 132,134 to releasably couple any one or more of the solar modules 108 to each other and to one or both of the non-solar and energy storage modules 104,106.

Referring now to FIGS. 2A-2F, there are shown top plan, bottom plan, right side elevation, left side elevation, front elevation, and rear elevation views of any one of the solar modules 108. The solar module 108 comprises a photovoltaic panel 102 that is centrally located on the module 108. In the depicted embodiment, the panel 102 is vertically and horizontally centered on the module 108, although in alternative embodiments (not depicted) the panel 102 may be non-centered along one or both of the module's 108 height and width. The portion of the module 108 that is horizontally aligned with the panel 102 is referred to as the module's 108 central portion 140, while the portions of the module 108 on the left and right of the central portion 140 are the module's 108 left and right edge portions 136a,b, respectively. The underside of the module 108 comprises four locator pins 128 while the top side of the module 108 comprises four locator pin receptacles 126; the locator pins and receptacles 128,126 help align the solar modules 108 with each other and with the non-solar and energy storage modules 104,106: when the system 100 is in its collapsed state all of the locator pins 128 of the second and third solar modules 108b,c fit into the locator pin receptacles 126 of the first and second solar modules 108a,b, respectively; and, when the system 100 is in its expanded state the locator pins 128 on the right edge portion 136b of the second solar module 108b fit into the locator pin receptacles 126 on the left edge portion 136a of the first solar module 108a while the locator pins 128 on the left edge portion 136a of the third solar module 108c fit into the locator pin receptacles 126 on the right edge portion 136b of the first solar module 108a.

Figure 2A:
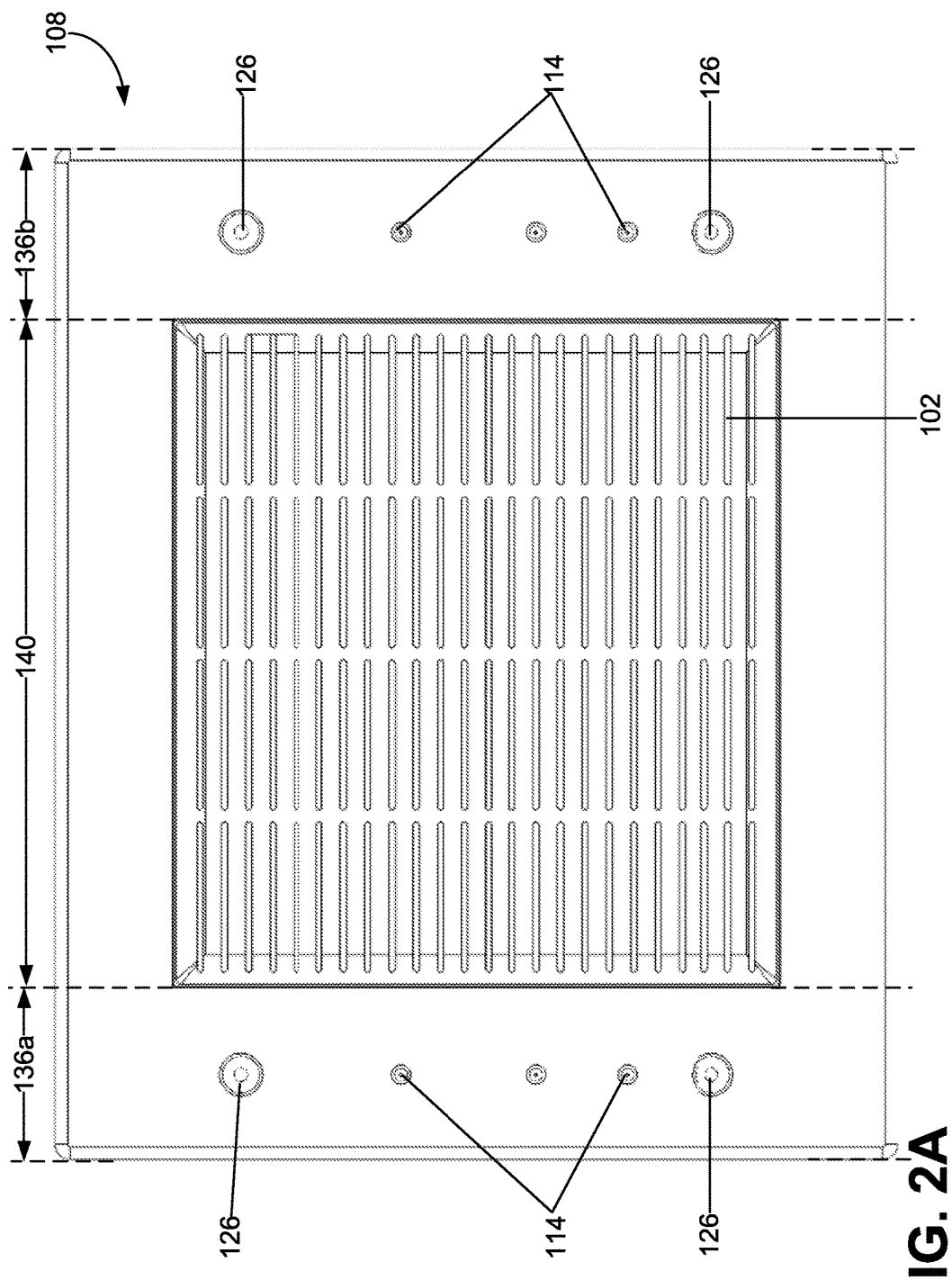

The module 108 also comprises, on its top surface, two pairs of solar power input terminals 114, each of which comprises a solar power input signal terminal and a ground terminal. In FIG. 2A, the ground terminal is the terminal 114 nearer the top edge of the module 108, while the signal terminal is nearer the bottom edge of the module 108. The solar power input terminals 114 are electrically coupled to a printed circuit board ("PCB", not shown) contained within the module's 108 housing. On this PCB, the ground terminals on the left and right edge portions 136a,b are shorted together and the solar power input signal terminals on the left and right edge portions 136a,b are shorted together. As discussed in further detail below, the solar power input terminals 114 permit the solar modules 108 to be electrically coupled together in parallel regardless of whether the system 100 is in its collapsed or expanded states.

On the underside or bottom surface of the module 108 are a pair of flow-through input terminals 110 on the left edge portion 136a, a pair of flow-through output terminals 112 on the right edge portion 136b, and two pairs of solar power output terminals 116; the flow-through and solar power output terminals 110,112,116 share a common ground terminal but have distinct signal terminals ("flow-through input signal terminal", "flow-through output signal terminal", and "solar power output signal terminals", respectively). The terminals 110,112,116 are electrically coupled to the module's 108 PCB. On this PCB, the ground terminals on the left and right edge portions 136a,b are shorted together, the flow-through input signal terminal is shorted to the flow-through output signal terminal, and the solar power output signal terminals on the left and right edge portions 136a,b are shorted together. The solar power output terminals 116 are also shorted to the solar power input terminals 114 on the module's 108 top side; more specifically, the solar power input signal terminals are shorted to the solar power output signal terminals, while all the module's 108 ground terminals are shorted together so that all terminals share a common ground.

Figure 2B:
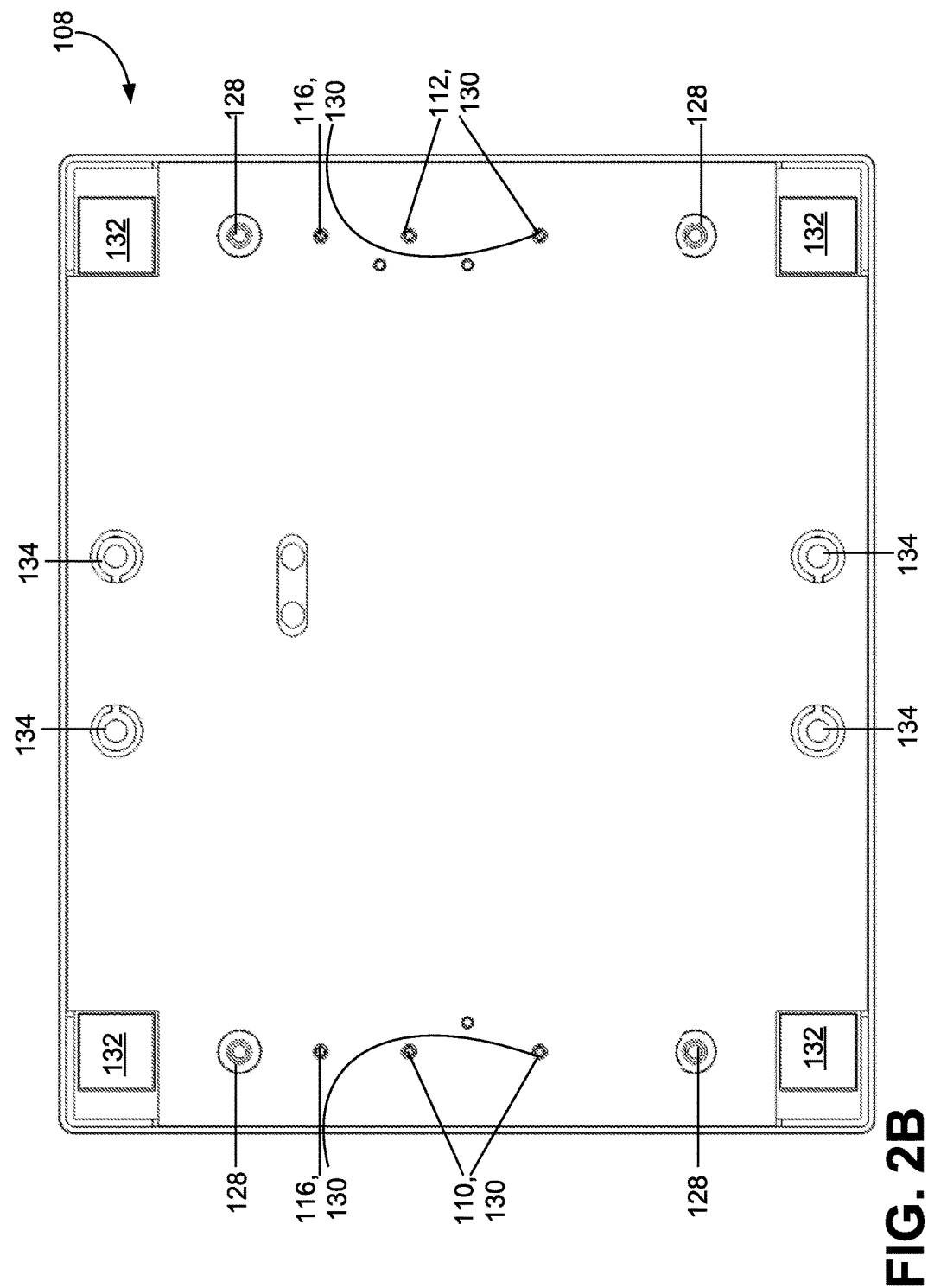

FIG. 2B shows the four corner magnets 132, one of which is located in each of the module's 108 four corners, and the central magnets 134, two of which are located near the top edge of the central portion 140 and two of which are located near the bottom edge of the central portion 140. When the system 100 is in its collapsed state, the corner and central magnets 132,134 of the second and third solar modules 108b,c are attracted to the corner and central magnets 132,134 and metallic housings of the first and second solar modules 108a,b, respectively. Similarly, the corner and central magnets 132,134 of the first solar module 108a are attracted to the metallic housings of the non-solar and energy storage modules 104,106. The various components of the system are accordingly releasably coupled together.

When the system 100 is in its expanded state, the corner magnets 132 on the left edge portion 136a of the third solar module 108c and on the right edge portion 136b of the first solar module 108a releasably couple the first and third solar modules 108a,c together, while the corner magnets 132 on the right edge portion 136b of the second solar module 108b and on the left edge portion 136a of the first solar module 108a releasably couple the first and second solar modules 108b,c together. As when the system 100 is in the collapsed state, the corner and central magnets 132,134 of the first solar module 108a are attracted to the metallic housings of the non-solar and energy storage modules 104,106. Finger slots 148 are formed into the sides of the non-solar and energy storage modules 104,106 to help the consumer move the solar modules 108 and transition the system 100 between its collapsed and expanded states.

The flow-through and solar power output terminals 110, 112,116 comprise spring-loaded electrically conductive pins in the form of pogo pins 130. The solar power input terminals 114 are shaped to receive the pogo pins 130 and to allow the pins 130 to compress against the PCB contained within the modules 108, thus enabling electrical coupling between different solar modules 108.

FIG. 2A shows two unlabeled terminals: one between the solar power input signal terminal and the ground terminal on the left edge portion 136a and another analogously positioned on the right edge portion 136b. When the system 100 is in its collapsed state, these unlabeled terminals on the first solar module 108a receive the flow-through input and output signal terminals of the second solar module 108b, and these unlabeled terminals on the second solar module 108b receive the flow-through input signal terminals of the third solar module 108c. When the system 100 is in its expanded state, these unlabeled terminals on the first solar module 108a receive the flow-through output signal terminal of the second module 108b and the flow-through input signal terminal of the third module 108c. These unlabeled terminals are shorted to each other and to the flow-through input and output signal terminals, but are not electrically coupled to any other electrical components. Consequently, the pogo pins 130 inserted into these unlabeled terminals help to mechanically couple the modules 108 together, but do not affect the system's 100 electrical operation.

Referring now to FIGS. 3A-3F, there are shown top plan, bottom plan, right side elevation, left side elevation, front elevation, and rear elevation views of the non-solar module 104. The underside of the non-solar module 104 comprises positive and negative non-solar input terminals 118, which in the depicted embodiment are battery terminals for AA and AAA sized batteries 146. In an alternative embodiment (not depicted), the non-solar input terminals 118 may be designed to receive a fuel cell as opposed to the batteries 146. While the depicted embodiment shows the non-solar module 104 lacking a battery cover, in alternative embodiments (not depicted) the non-solar module 104 comprises a battery cover that shields the batteries 146 and the terminals 118 during normal use. The non-solar input terminals 118 are electrically coupled to non-solar output terminals 120 on a top side of the non-solar module 104. These non-solar output terminals 120 are positioned to be aligned with the flow-through input terminals 110 of the first solar module 108a when the system 100 is in its collapsed and expanded states, and are shaped to receive the pogo pins 130 that comprise those input terminals 110.

Referring now to FIGS. 4A-4F, there are shown top plan, bottom plan, right side elevation, left side elevation, front elevation, and rear elevation views of the energy storage module 106. The top side of the energy storage module 106 comprises solar charging terminals 122 and non-solar charging terminals 124. The solar and non-solar charging terminals 122,124 share a common ground terminal but have distinct signal terminals. The solar charging terminals 122 are positioned to be aligned with the first module's 108a solar power output terminals 116 and are shaped to receive the pogo pins 130 that comprise those output terminals 116. The non-solar charging terminals 124 are positioned to be aligned with the first module's 108a flow-through output terminals 112 and are shaped to receive the pogo pins 130 that comprise those output terminals 112. Consequently, the energy storage module 106 receives power from the non-solar module 104 via the non-solar input and output terminals 118,120 of the non-solar module 104, the flow-through input and output terminals 110,112 of the first solar module 108a, and then the non-solar charging terminals 124. When the system 100 is in its collapsed state only the third solar module 108c converts sunlight to electricity; this electricity is conducted from the third module's 108c solar power output terminals 116, to the second module's 108b solar power input terminals 114, to the second module's 108b solar power output terminals 116, to the first module's 108a solar power input terminals 114, to the first module's 108a solar power output terminals 116, and then to the solar charging terminals 122. And when the system 100 is in its expanded state, electricity generated by the first solar module 108a is conducted to that module's 108a solar power output terminals 116 and then to the solar charging terminals; electricity generated by the second solar module 108b is conducted to that module's 108b solar power output terminals 116, to the first module's 108a solar power input terminals 114, to the first module's 108a solar power output terminals 116, and then to the solar charging terminals; and electricity generated by the third solar module 108c is conducted to that module's 108c solar power output terminals 116, to the first module's 108a solar power input terminals 114, to the first module's 108a solar power output terminals 116, and then to the solar charging terminals. Regardless of the electricity's source, electricity received by the energy storage module 106 is received and routed by electrical circuitry 500 contained within the energy storage module 106 to an energy storage device in the form of the rechargeable battery 502. The first solar module 108a thereby acts as a backplane conducting electricity from the non-solar module 104 to the energy storage module 106, permitting simultaneous charging of the rechargeable battery 502 by the non-solar module 104 and by the solar modules 108. The PCB of the first solar module 108a (and, in the depicted embodiment, of the second and third solar modules 108b,c as well) accordingly comprises flow-through traces and solar power traces. The flow-through traces comprise the trace that connects the ground terminals together and the trace that connects the flow-through input and output signal terminals together, while the solar power traces comprise the trace that connects the ground terminals together and the trace that connects the solar power input and output terminals together.

Figure 5:
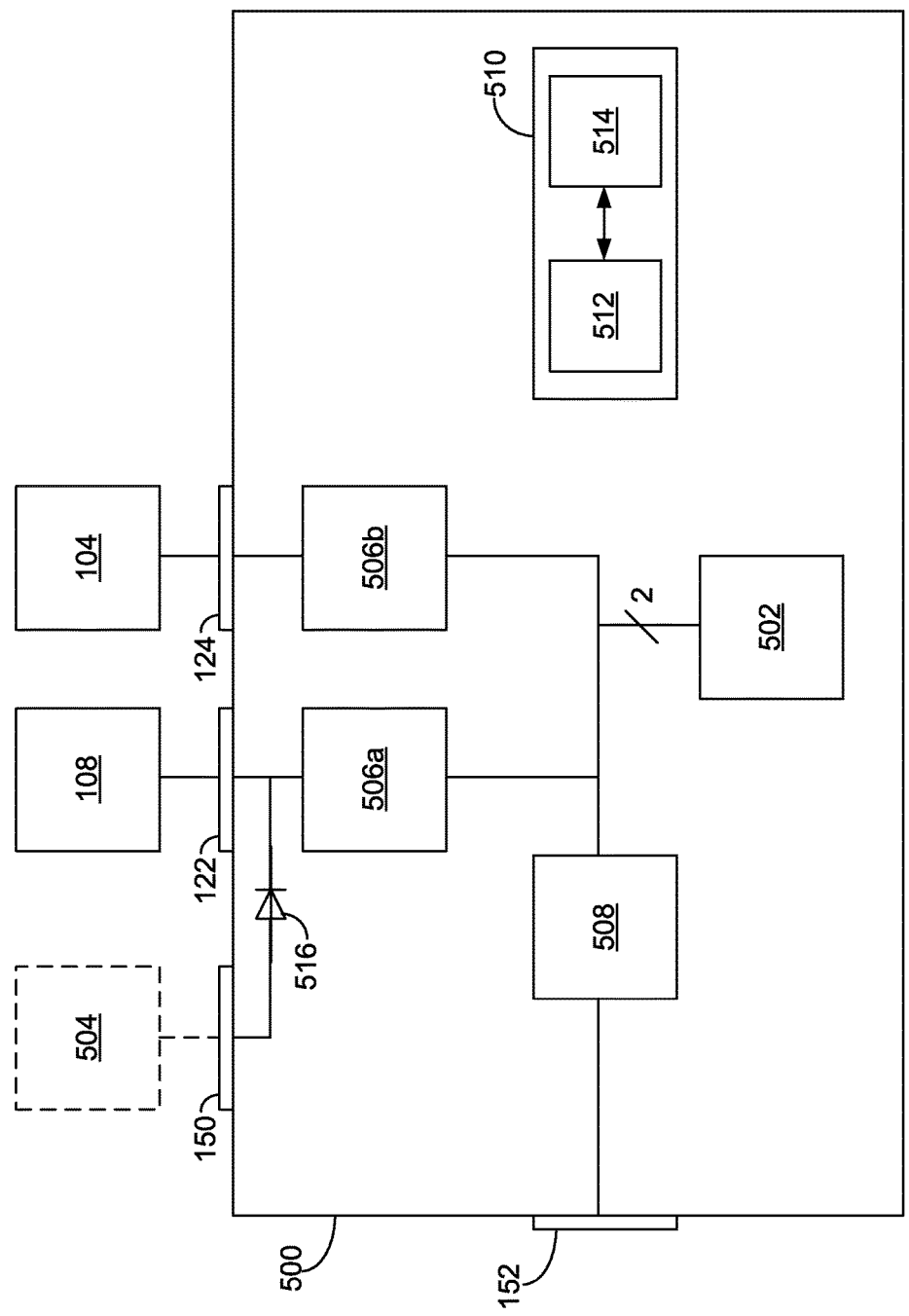
FIG. 5 is a block diagram of electrical circuitry comprising part of the energy storage module of FIGS. 4A-4F.

Referring now to FIG. 5, the electrical circuitry 500 comprises first and second DC-DC boost converters 506a,b respectively electrically coupled to the solar modules 108 and the non-solar module 104 via the solar charging terminals 122 and the non-solar charging terminals 124. The circuitry 500 also optionally includes DC power from a wall wart 504, which, when present, is electrically coupled to the first boost converter 506a via the micro-USB port 150 and in parallel with the solar modules 108. Reverse current protection circuitry in the form of a diode 516 provides reverse current protection for the wall wart 504. In FIG. 5, example voltages being input to the circuit 500 are 5 V from the wall wart 504 (reduced to approximately 4.3 V at the input of the first boost converter 506a due to the diode 516), 4-6 V from the solar modules 108, and 0.7-1.6 V from the non-solar module 104.

Example boost converters 506a comprise, for example, an inductor in series with a switch such as a MOSFET with a diode electrically coupled between the inductor and the switch; this diode acts as reverse current protection circuitry to provide reverse current protection for the modules 104, 108, and in particular for the non-solar module 104 when the non-solar module 104 provides power from an electrochemical source such as a fuel cell or non-rechargeable battery. Having a diode at the output of the boost converters 506a,b means that the diode drop of approximately 0.7 V is applied to an amplified voltage as opposed to the unamplified voltages the modules 104,108 output. Consequently, the percentage drop in input voltage that the diode voltage drop represents is less in the embodiment of FIG. 5 than in a conventional circuit in which reverse current protection diodes would be located between the modules 108,104 and boost converters 506a,b, respectively.

The output of the boost converters 506a,b is approximately 6.6 V-8.4 V, and the outputs of the boost converters 506a,b are electrically coupled to the rechargeable battery 502 to charge it and to a DC-DC buck converter 508 to output a 5 V signal having a maximum 2 A current to the USB port 152 for charging an electrically powered device (not shown) such as a mobile phone. The rechargeable battery 502 has both charge and discharge ports and comprises a pair of 18650 Lithium Ion cells having a total capacity of 15 W·h; however, in alternative embodiments (not depicted) different types of energy storage devices may be used.

The circuitry 500 further comprises a microcontroller 510 that has a processor 512 communicatively coupled with a non-transitory computer readable medium 514 in the form of non-volatile memory for storing program code to cause the processor 512 to operate the circuitry 500, and in the form of volatile memory for temporarily storing instructions the processor 512 performs at runtime. Although not shown in FIG. 5, the microcontroller 510 is electrically coupled to the output of the buck converter 508 for power, and is communicatively coupled to each of the buck converters 506a,b, the buck converter 508, and enable pins for the micro-USB port 150 and USB port 152 so as to control operation of the circuitry 500. Although not shown in FIG. 5, the circuitry 500 further comprises sensing circuitry that enables the processor 512 to monitor voltage and current levels at various circuit nodes. In particular, the processor 512 uses pulse width modulation to modulate the boost converters 506a,b so that the average power drawn from the modules 108,104 and wall wart 504 is maximized using maximum power point tracking. The processor 512 monitors current and voltage at the output of each of the modules 108,104 and the wall wart 504 in order to determine how to so modulate the converters 506a,b. The maximum voltage output by each of the wall wart 504 and modules 108,104 is less than the minimum voltage required to charge the rechargeable battery 502, thus permitting use of the boost converters 506a,b and permitting the circuitry 500 to take advantage of the reverse current protection that the diodes comprising the converters 506a,b confer.

As discussed above, the solar modules 108 in the depicted embodiment are electrically coupled to each other in parallel regardless of whether the system 100 is in the collapsed or expanded states, although in alternative embodiments (not depicted) any two or more of the solar modules 108 may be electrically coupled in series with each other or with the non-solar module 104. Further, although the depicted embodiments show a system comprising three solar modules 108, in alternative embodiments (not depicted) the system may comprise only one or two solar modules 108, or four or more solar modules 108, any one or more of which may be electrically coupled in parallel, series, or in a hybrid series-parallel configuration with each other. Similarly, alternative embodiments (not depicted) may comprise multiple non-solar modules 104, any number of which may be connected in parallel, series, on in a hybrid series-parallel configuration with each other. Additionally, while in the depicted embodiment the reverse current protection circuitry comprises diodes, in alternative embodiments (not depicted) alternative circuitry, such as switches (e.g. field effect transistors) controlled by the processor 512, may be used.

In the depicted embodiments the solar modules 108 are rectangular; however, in alternative embodiments (not depicted), the solar modules 108 may have a different shape and may or may not be identical to each other. For example, one or more of the solar modules 108 may be square or another polygonal shape, and the polygonal shape may or may not be a regular polygon. Alternatively or additionally, one or more of the solar modules 108 may be non-polygonal, such as circular or elliptical.

While the microcontroller 510 in the foregoing embodiments comprises the processor 512, in alternative embodiments (not depicted) it may comprise, for example, a microprocessor, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A system for charging an energy storage device, the system comprising:
   a first solar module comprising;
   a first photovoltaic panel,
   a first solar power output terminals, and
   a flow-through input and output terminals,
   at least one non-solar module;
   at least one non-solar input terminal, and
   at least one non-solar output terminal,
   at least one energy storage module comprising;
      an energy storage device, and
      at least one solar charging terminal and at least one non-solar charging terminal,
   the first solar module further comprises;
      the first solar power output terminals electrically coupled to the first photovoltaic panel, and
      the flow-through input and output terminals electrically coupled to each other;
   the at least one non-solar module further comprises;
      the non-solar module is releasably coupled to the first solar module,
      the non-solar module has non-solar input terminals for electrical coupling to an energy input device,
      the non-solar output terminals electrically coupled to the non-solar input terminals, and
      wherein the non-solar output terminals are electrically coupled to the flow-through input terminals only when the non-solar module is coupled to the first solar module,
   the at least one energy storage module further comprises:
      the energy storage module is releasably coupled to the first solar module,
      the at least one solar charging terminal and the at least one non-solar charging terminals electrically coupled to the energy storage device,
      wherein the solar charging terminals are electrically coupled to the first solar power output terminals and the non-solar charging, terminals are electrically coupled to the flow-through output terminals only when the energy storage module is coupled to the first solar module.

2. The system as claimed in claim 1 wherein:
   the first solar module further comprises;
   at least one first solar power input terminal electrically coupled to the first solar power output terminals in parallel with the first photovoltaic panel, and
   at least one additional solar module releasably coupled to the first solar module, the at least one additional solar module comprising,
      a photovoltaic panel,
      at least one solar power output terminal electrically coupled to the photovoltaic panel and to the first solar power input terminals, and wherein
      the at least one solar power output terminal electrically coupled to the first solar power input terminals only when the first and at least the one additional solar modules are coupled together.

3. The system as claimed in claim 1 wherein:
   at least one of the solar module and the non-solar module comprises a magnet,
   at least one of the other solar module and the non-solar module comprises a ferromagnetic material, and wherein
   the magnet and the ferromagnetic material releasably couple the at least one of the solar module and at least one of the non-solar module together.

4. The system as claimed in claim 1 wherein:
   at least one of the solar module and at least one of the energy storage module comprises a magnet,
   at least one of the other of the solar module and at least one of the energy storage module comprises a ferromagnetic material, and wherein
   the magnet and the ferromagnetic material releasably couple the at least one of the solar module and the energy storage module together.

5. The system as claimed in claim 1 wherein:
   at least one of the solar module and at least one of the non-solar module comprises spring-loaded electrically conductive pins that electrically couple the non-solar output terminals and the flow-through input terminals together.

6. The system as claimed in claim 1 wherein:
   at least one of the solar module and at least one of the energy storage module comprises spring-loaded electrically conductive pins that electrically couple the flow-through output terminals and the non-solar charging terminals together and that electrically couple the at least one of the solar power output terminals and the solar charging terminals together.

7. The system as claimed in claim 6 wherein:
   at least one of the solar modules comprises spring-loaded electrically conductive pins that electrically couple the solar power output terminals and the first solar power input terminals together.

8. The system as claimed in claim 7 wherein
   the solar modules are square or rectangular, and wherein;
   the first and at least one additional photovoltaic panels are located on a central portion of the first and at least one additional solar modules, respectively;
   the first and at least one additional solar modules comprises magnets located in the corners of the first and at least one additional solar modules, respectively;
   the first solar power input terminals are located on left and right edge portions of a top side of the first solar module;
   at least one additional solar power output terminals are located on a right edge portion of an underside of the at least one additional solar module; and
   at least one additional solar power output terminals are located on a left edge portion of an underside of the at least one additional solar module,
   the solar modules being couplable in a collapsed state in which the first and at least one additional solar modules are stacked on each other and an expanded state in which the right edge portion of the underside of the at least one additional solar panel is magnetically coupled to the left edge portion of the top side of the first solar panel and the left edge portion of the underside of at least one additional solar panel is magnetically coupled to the right edge portion of the top side of the first solar panel.

9. The system as claimed in claim 6 wherein the first solar module through the at least one additional solar modules have identical dimensions.

10. The system as claimed in claim 6 wherein: the first solar module through the at least one additional solar modules are identical to each other.

11. The system as claimed in claim 1 wherein
the energy storage module further comprises
a device charging port electrically coupled to the energy storage device, for connection to and charging of an electrically powered device.

12. A system for charging an energy storage device, the system comprising:
a first solar module comprising:
a first photovoltaic panel; and
a first backplane comprising flow-through traces and solar power traces, the solar power traces being electrically coupled to the first photovoltaic panel;
a non-solar module releasably coupled to the first solar module, the non-solar module comprising
at least one non-solar input terminal for electrical coupling to an energy input device and
at least one non-solar output terminals electrically coupled to the non-solar input terminals, wherein
at least one non-solar output terminals are electrically coupled to the flow-through traces only when the non-solar module is coupled to the first solar module; and
an energy storage module releasably coupled to the first solar module, the energy storage module comprising:
the energy storage device; and
at least one solar charging terminal and at least one non-solar charging terminal electrically coupled to the energy storage device, wherein
the solar and non-solar charging terminals are electrically coupled to solar power traces and the flow-through traces, respectively, only when the energy storage module is coupled to the first solar module.

13. The system of claim 12 further comprising:
at least one additional solar module comprising;
a photovoltaic panel, and
at least one solar power output terminal electrically coupled to the photovoltaic panel and to the solar power traces, wherein
the at least one solar power output terminals are electrically coupled to the solar power traces only when the first and least one additional solar modules are coupled together.

14. The system as claimed in claim 12 wherein
the first and at least one additional photovoltaic panels are electrically coupled together in parallel.

15. The system as claimed in claim 12 wherein the first solar module through the at least one additional solar modules have identical dimensions.

16. The system as claimed in claim 12 wherein the first solar module through the at least one additional solar modules are identical.

17. The system as claimed in claim 12 wherein the system is configurable to collapsed and expanded states, wherein:
when in the expanded state, the at least one additional solar module is releasably couplable to a left edge portion of the first solar module and wherein
the other at least one additional solar module is releasably couplable to a right edge portion of the first solar module, wherein
the first photovoltaic panel is between the left and right edge portions of the first solar module; and
when in the collapsed state, the at least one additional solar module is stacked directly on and entirely overlaps the first solar module and the at least one more additional solar module is stacked directly on and entirely overlaps the second solar module.

18. The system as claimed in claim 1 wherein the energy storage module further comprises:
a first boost converter electrically coupled in series between the solar charging terminals and the energy storage device, wherein
a voltage at the solar charging terminals is less than a minimum voltage required to charge the energy storage device;
a second boost converter electrically coupled in series between the non-solar charging terminals and the energy storage device, wherein
a voltage at the nonsolar charging terminals is less than the minimum voltage required to charge the energy storage device;
a device charging port, electrically coupled to the energy storage device, for connection to and charging of an electrically powered device; and
a buck converter electrically coupled in series between the device charging port and the energy storage device.

19. A system as claimed in claim 12 additionally comprising:
one or more additional solar modules, each of the one or more additional solar modules releasably coupled to another of the solar modules and comprising;
at least one additional photovoltaic pane,
at least one additional backplane comprising solar power traces, the solar power traces for the additional backplane being electrically coupled to the additional photovoltaic panel and being electrically coupled to the solar power traces of the first backplane only when the additional solar module is coupled to the first solar module.

* * * * *